(12) United States Patent
Negishi

(10) Patent No.: US 12,545,499 B2
(45) Date of Patent: Feb. 10, 2026

(54) ARTICLE ACCOMMODATION CONTRAINER

(71) Applicant: BANDAI CO., LTD., Tokyo (JP)

(72) Inventor: Atsushi Negishi, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 0 days.

(21) Appl. No.: 18/614,679

(22) Filed: Mar. 24, 2024

(65) Prior Publication Data

US 2024/0351776 A1   Oct. 24, 2024

(30) Foreign Application Priority Data

Apr. 24, 2023  (JP) ................................. 2023-071072

(51) Int. Cl.
*B65D 85/00* (2006.01)
*B65D 43/02* (2006.01)

(52) U.S. Cl.
CPC ........... *B65D 85/70* (2013.01); *B65D 43/021* (2013.01); *B65D 2543/00601* (2013.01); *B65D 2543/00833* (2013.01)

(58) Field of Classification Search
CPC .... B65D 43/021; B65D 50/04; B65D 50/045; B65D 50/046; B65D 50/048; B65D 50/066; B65D 2543/00916; B65D 2543/00925
USPC ......... 220/4.01, 4.04, 4.06, 4.07, 4.05, 4.21, 220/4.24, 4.25
See application file for complete search history.

(56) References Cited

U.S. PATENT DOCUMENTS

| | | | | |
|---|---|---|---|---|
| 3,720,342 A | * | 3/1973 | Vercillo ............... | B65D 50/045 215/DIG. 1 |
| 4,221,293 A | * | 9/1980 | Anthony .............. | A47K 10/421 220/789 |
| 4,765,501 A | * | 8/1988 | Kao ..................... | B65D 43/021 220/4.21 |
| 4,936,479 A | * | 6/1990 | Levy .................... | A47G 21/001 426/115 |
| 5,792,496 A | * | 8/1998 | Fekete .................. | A23G 3/545 426/138 |

(Continued)

FOREIGN PATENT DOCUMENTS

| | | |
|---|---|---|
| CN | 114341013 A | 4/2022 |
| FR | 2829110 B1 | 1/2005 |

(Continued)

OTHER PUBLICATIONS

WIPO, International Search Report for International Application No. PCT/JP2024/010062, May 21, 2024.

(Continued)

*Primary Examiner* — Robert Poon
(74) *Attorney, Agent, or Firm* — IMAIZUMI IP LAW, PLLC; Toshikatsu Imaizumi

(57) ABSTRACT

An article accommodating container comprises a body portion which includes a first main component and a second main component, which can be connected to each other, wherein the first main component comprises a main body and a projecting portion, which projects from the main body and forms a connecting portion to be connected to the second main component, and a length of the projecting portion in a connecting direction of the first main component and the second main component is ⅕ or more of a length of a maximum diameter of the body portion in a connected state.

16 Claims, 6 Drawing Sheets

(56) References Cited

U.S. PATENT DOCUMENTS

| | | | | |
|---|---|---|---|---|
| 6,050,438 | A | * | 4/2000 | Kovens .................. B65D 11/02 |
| | | | | 220/4.24 |
| 2006/0201941 | A1 | * | 9/2006 | Lee ...................... B65D 81/365 |
| | | | | 220/4.21 |
| 2007/0199933 | A1 | * | 8/2007 | Salice .................... A23G 3/563 |
| | | | | 220/4.21 |

FOREIGN PATENT DOCUMENTS

| JP | S53-110977 | U | 9/1978 |
|---|---|---|---|
| JP | S63-005571 | U | 1/1988 |
| JP | H07-61466 | U | 3/1995 |
| JP | 2000-318722 | A | 11/2000 |
| JP | 2022-187047 | A | 12/2022 |
| TW | M361493 | U1 | 7/2009 |
| TW | 2015-05919 | A | 2/2015 |
| WO | 90/07961 | A | 7/1990 |
| WO | 93/00267 | A1 | 1/1993 |

OTHER PUBLICATIONS

WIPO, Written Opinion for International Application PCT/JP2024/010062, May 21, 2024 (A partial machine translation is attached hereto).
JPO, Office Action for Japanese Patent Application No. 2023-071072, Jan. 9, 2024 (A machine translation is attached hereto).
EPO, European Search Report 1 for European Patent Application No. 24167392, Oct. 9, 2024.
EPO, European Search Report 2 for European Patent Application No. 24167392, Oct. 9, 2024.
Taiwan Intellectual Property Office, Ministry of Economic Affairs, Taiwanese Office Action for Taiwanese Patent Application No. 113107195, Oct. 7, 2024 (A machine translation is attached hereto).
JPO, Office Action for Japanese Patent Application No. 2023-071072, May 13, 2024 (A machine translation is attached hereto).
Korea Patent Office, Office Action for Korean Patent Application No. 10-2024-0032381, Sep. 30, 2025.

* cited by examiner

ARTICLE ACCOMMODATION CONTRAINER

CROSS-REFERENCE TO RELATED APPLICATION

The disclosure of Japanese Patent Application No. 2023-071072 filed Apr. 24, 2023 including specification, drawings and claims is incorporated herein by reference in its entirety.

TECHNICAL FIELD

The present invention relates to an article accommodation container.

BACKGROUND

Conventionally, an article accommodation container in a shape of a capsule is used to accommodate an article inside the capsule. For example, Japanese Utility Patent Application Publication No. S53-110977 discloses that a figure (toy) is enclosed in such a capsule and the outer surface of the capsule is covered with a confection.

SUMMARY

Technical Problem

In Japanese Utility Patent Application Publication No. S53-110977, the spherical article accommodation container is configured by combining two hemispherical capsules. The Japanese Utility Patent Application Publication does not describe the configuration of the portion for connecting hemispherical parts which form the capsule. Nevertheless, for products using such capsules, it is necessary to have a user-friendly configuration, such that even small children can easily open the capsule, and it is necessary to maintain a state where an article such as a toy is enclosed during manufacturing and the capsule can be securely closed.

Therefore, it is an object of the present invention to provide an article accommodation container having a user-friendly configuration.

Solution to Problem

One of the aspects of the present invention is an article accommodation container. The article accommodation container includes a body portion comprising a first main part and a second main part, wherein the first main part and the second main part can be connected to each other. The first main part comprises a body portion, a connecting portion to be connected to the second main part, and a projecting portion which rises from the body portion. The length of projecting portion in a connecting direction of the first main part and the second main part is ⅕ or longer of the maximum diameter of the body portion part in a connecting state where the first main part and the second main part are connected to each other.

Advantageous Effect of Invention

According to the present invention, an article accommodation container having a user-friendly configuration can be provided.

DETAILED DESCRIPTION

Figure 1:
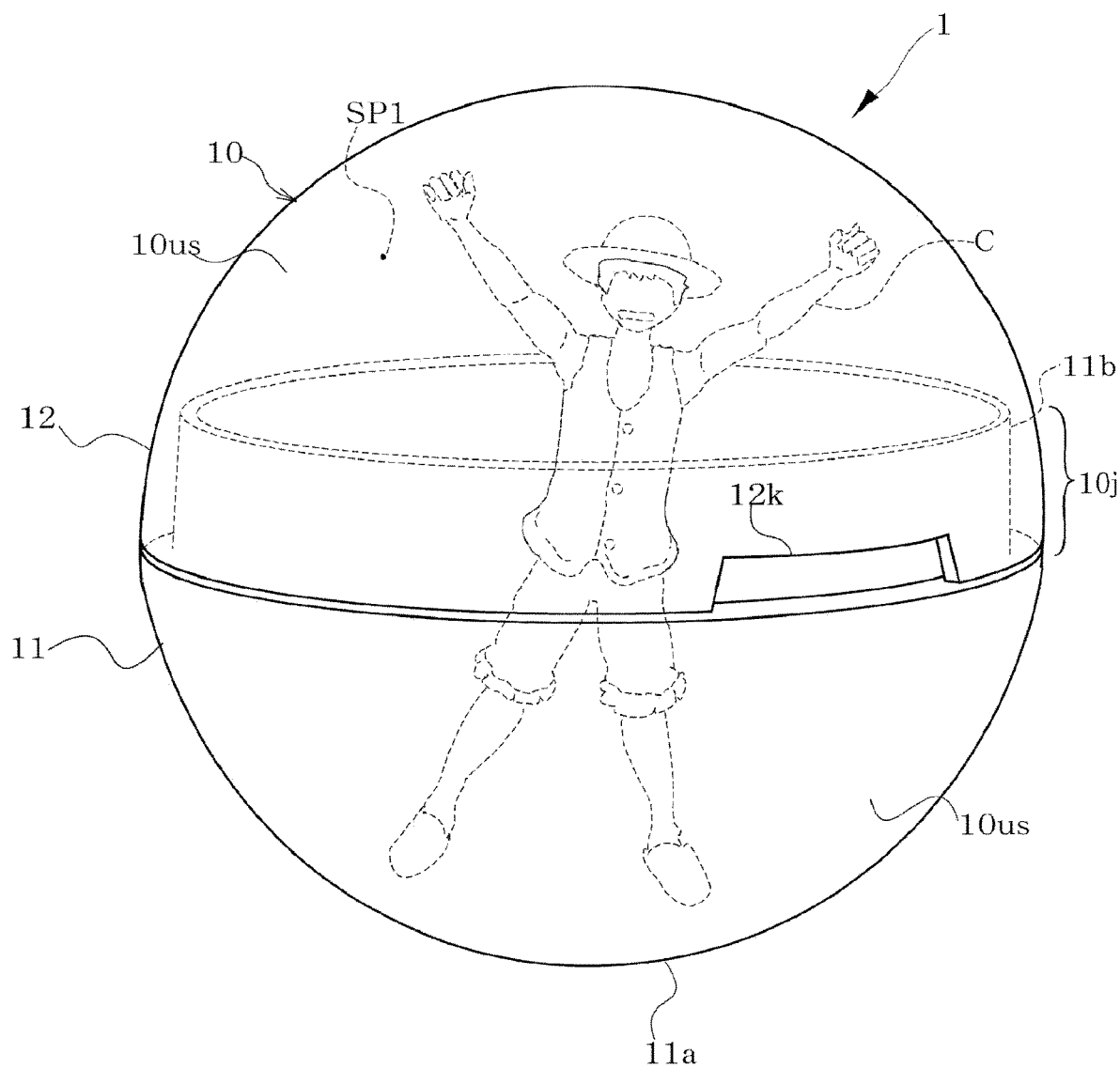
FIG. 1 is a perspective view of an article accommodation container according to an embodiment of the present invention, wherein an article is accommodated.
Figure 2:
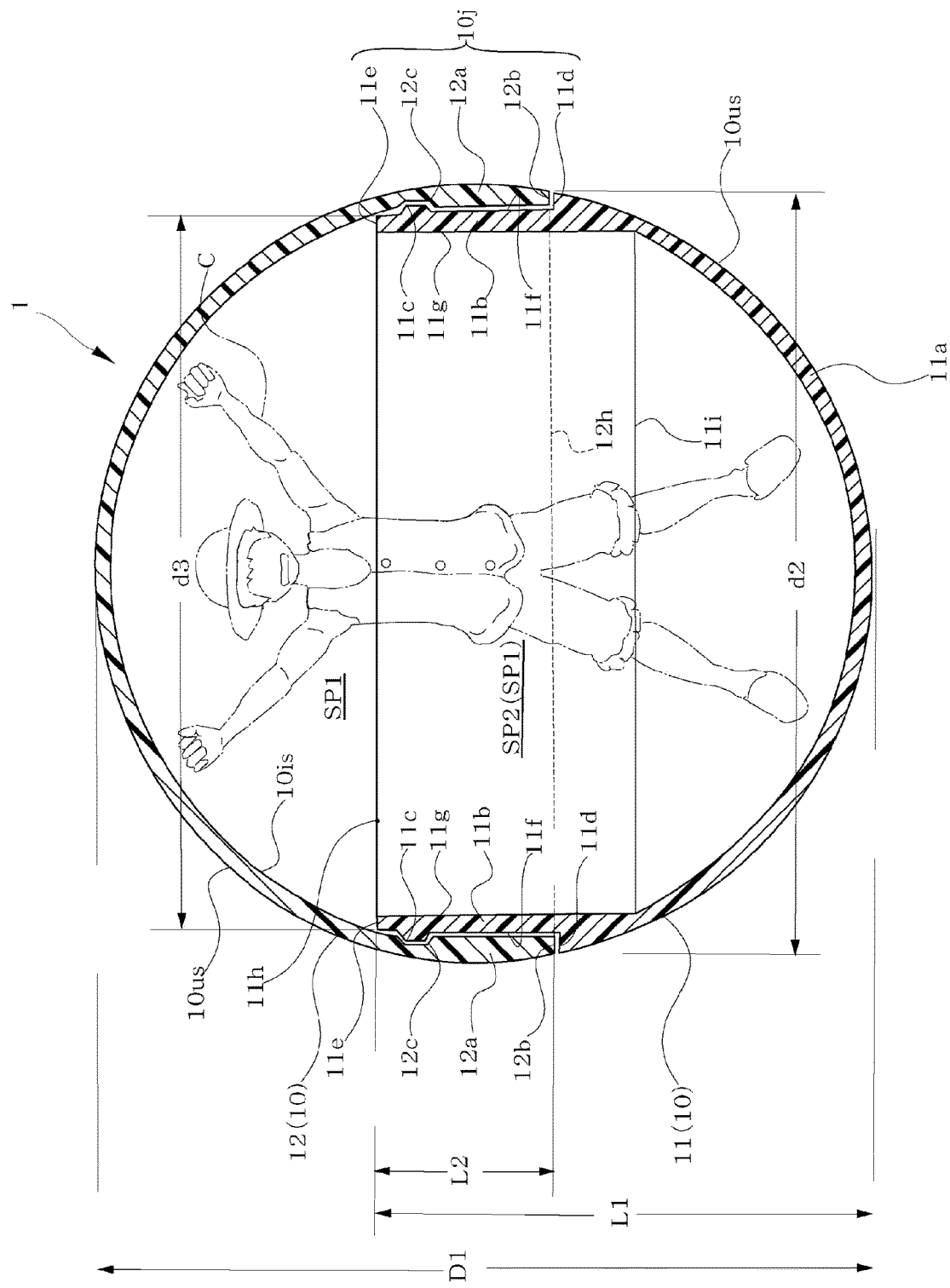
FIG. 2 is a cross sectional view of a main part of the article accommodation container shown in FIG. 1.
Figure 3:
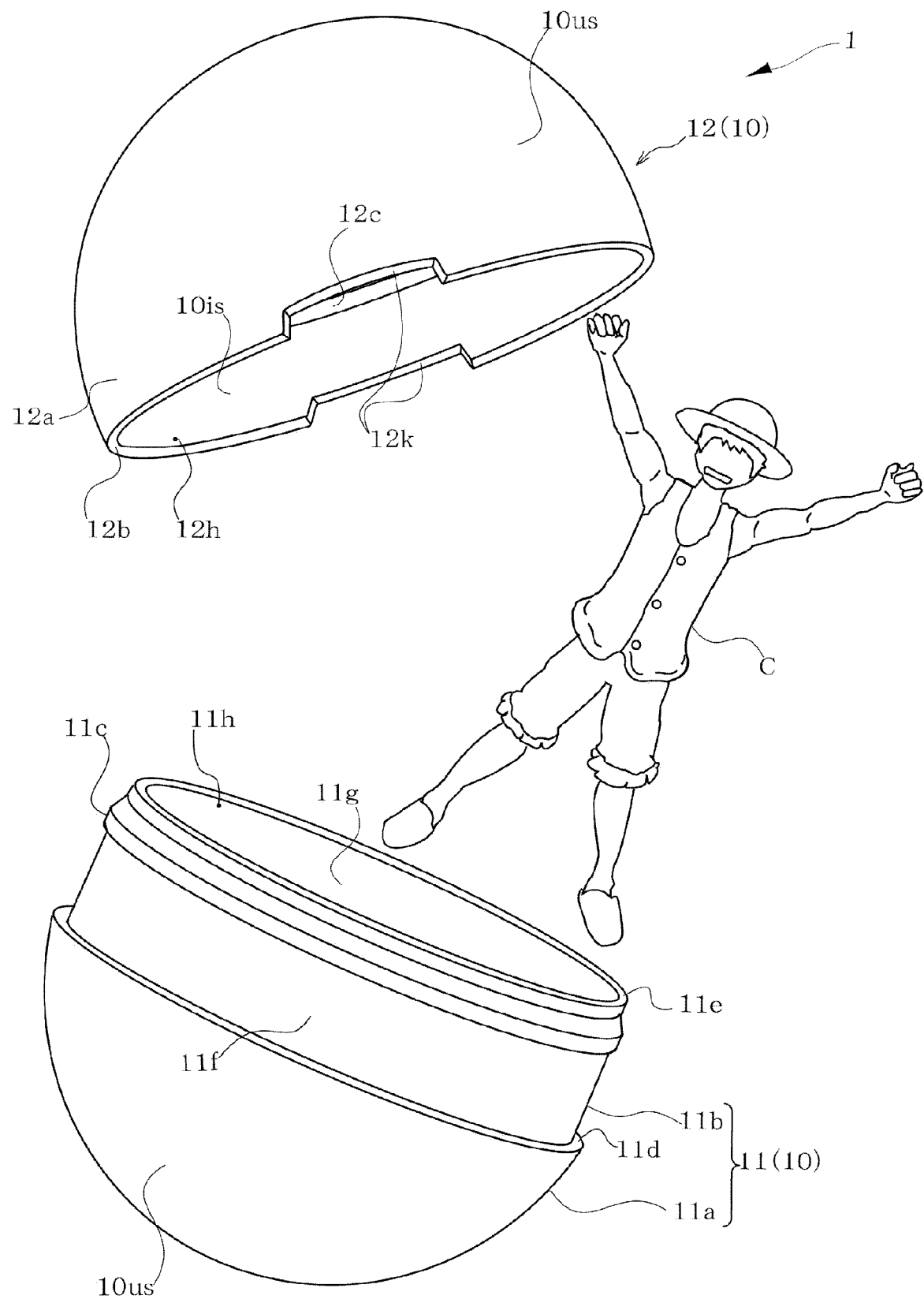
FIG. 3 is an exploded perspective view of the article accommodation container shown in FIG. 1.

An article accommodation container according to an embodiment of the present invention will be explained below, referring to drawings. FIG. 1 is a perspective view of an article accommodation container according to an embodiment of the present invention, wherein an article is accommodated. FIG. 2 is a cross-sectional view of a main part of the article accommodation container. FIG. 3 is an exploded perspective view of the article accommodation container.

The article accommodation container 1 comprises a body portion 10 composed of a first main component 11 and a second main component 12 capable of being connected to each other, as shown in FIGS. 1 and 2. The first main component 11 and the second main component 12 form a spherical shape on the outer surface 10us formed in a state where the first man component 11 and the second main component 12 are connected to each other. The first main component 11 includes a substantially hemispherical main body 11a and a cylindrical projecting portion 11b extending from the main body 11a (also see FIG. 3). The projecting portion 11b constitutes a connecting portion 10j which is connected to the second main component 12.

Furthermore, the projecting portion 11b has a first end portion 11e constituting a peripheral edge portion of a first opening 11h on its protruding tip end side thereof, and an annular convex ridge portion 11c is formed on an outer peripheral surface 11f of the projecting portion 11b along the circumferential direction of the outer peripheral surface 11f. This convex ridge portion 11c is formed at a position closer to the first end portion 11e than a protruding base end side from which the projecting portion 11b projects. Additionally, the projecting portion 11b is provided with a second end portion 11d having a step in the intersecting direction (orthogonal direction in this embodiment) with respect to the outer peripheral surface 11f of the projecting portion 11b at the protruding base end side of the projecting portion 11b. In this configuration, the maximum outer diameter the outer peripheral surface 11f which forms the outer periphery of the first end portion 11e is smaller than the maximum outer diameter of the outer periphery of the second end portion 11d. In other words, the projecting portion 11b is configured such that the outer diameter d3 of the tip portion of the projecting portion 11b is smaller than the maximum diameter d2 of the main body 11a, and when the projecting portion 11b is fitted inside the second main component 12, they are connected without forming a step on the outer surface 10us as shown in FIG. 1.

On the other hand, on the inner surface 10is of the second main component 12, a concave portion 12c capable of accommodating the convex ridge portion 11c is formed along the circumferential direction of a second opening 12h. The position where the concave portion 12c is formed, is located inside the second main component 12 away from the third end portion 12b which forms the second opening 12h. Therefore, as shown in FIG. 2, in the state where the first main component 11 and the second main component 12 are connected to each other, the outer peripheral surface 11f of the projecting portion 11b is in contact with a portion of the inner peripheral surface 10is of the second main component 12 which is located near the second opening 12h.

The body portion 10 is made of a suitably colored synthetic resin and is configured so that an article C such as a character contained in the internal space SP1 thereof is invisible from the outside when the first main component 11 and the second main component 12 are connected to each other.

Furthermore, although the projecting portion 11b is formed only on the first main component 11, as shown in FIG. 2, in the connected state where the third end portion 12b is in contact with the second end portion 11d of the first main component 11, the projecting portion 11b is covered by the overlapping portion 12a of the second main component 12 so as not to be visible from the outside.

When the first main component 11 and the second main component 12 are connected to each other, as mentioned above, while the outer surface 10us forms a spherical shape as a whole, the inner surface 10is, as shown in FIG. 2, forms a slightly elongated internal space SP1. That is, it is a space where a substantially hemispherical shapes are connected above and below to the cylindrical space SP2 surrounded by an inner peripheral surfaces 11g of the projecting portion 11b, a virtual face including the lower end side curved line Iii of the inner peripheral surface 11g, and a virtual face including the first end portion 11e. By configuring the internal space SP1 in a non-spherical shape in this way, it is possible to restrict the rotational movement of the article C contained in the internal space SP1.

FIG. 3 is an exploded perspective view of the article accommodation container 1. As shown in FIG. 3, two substantially rectangular cutout portions 12k are formed and positioned so as to be 180 degrees apart on the third end portion 12b of the second main component 12.

The connection state between the second main component 12 and the first main component 11 includes a state where the third end portion 12b is in contact with the first end portion 11e (initial connection state or final connection released state), and an engaged state where the third end portion 12b is in contact with the second end portion 11d (see FIG. 2)). For example, a certain length (a length L2 in a connection direction) required for a slide movement in the connection direction is secured between the initial state of insertion and connection and the final state of insertion and connection. As a result, in the connecting portion 10j, the engaged connection state is stably maintained, and as described later, the disassembly operation of the body portion 10 can be easily performed.

The size of the rise of the projecting portion 11b (the length L2 in the connection direction (refer to FIG. 2)) influences its operability depending on its relationship with the length in the connection direction (the length D1 of the maximum diameter of the body portion 10) of the first main component 11 and the second main component 12 in the connected state. For example, when the length L2 of the projecting portion 11b is a certain size or more, the maintenance of the engaged state and the operability of release of the connection are improved. The relationship between the length L2 the projecting portion 11b in the connection direction thereof and the length D1 of the maximum diameter of the body portion 10 improves an operability thereof when the length L2 is configured to be ⅕ or more of the length D1.

Here, the material of the body portion 10 is synthetic resin (PVC, PC, etc.), and the length D1 of the maximum diameter thereof is in a range of 20.0 mm to 80.0 mm, and the thickness thereof is in a range of 1.00 mm to 3.00 mm.

Furthermore, when compared to the size of the first main component 11, the length L2 in the connection direction of the projecting portion 11b is ⅓ or more of the maximum length L1 in the connection direction of the first main component 11.

Figure 4:
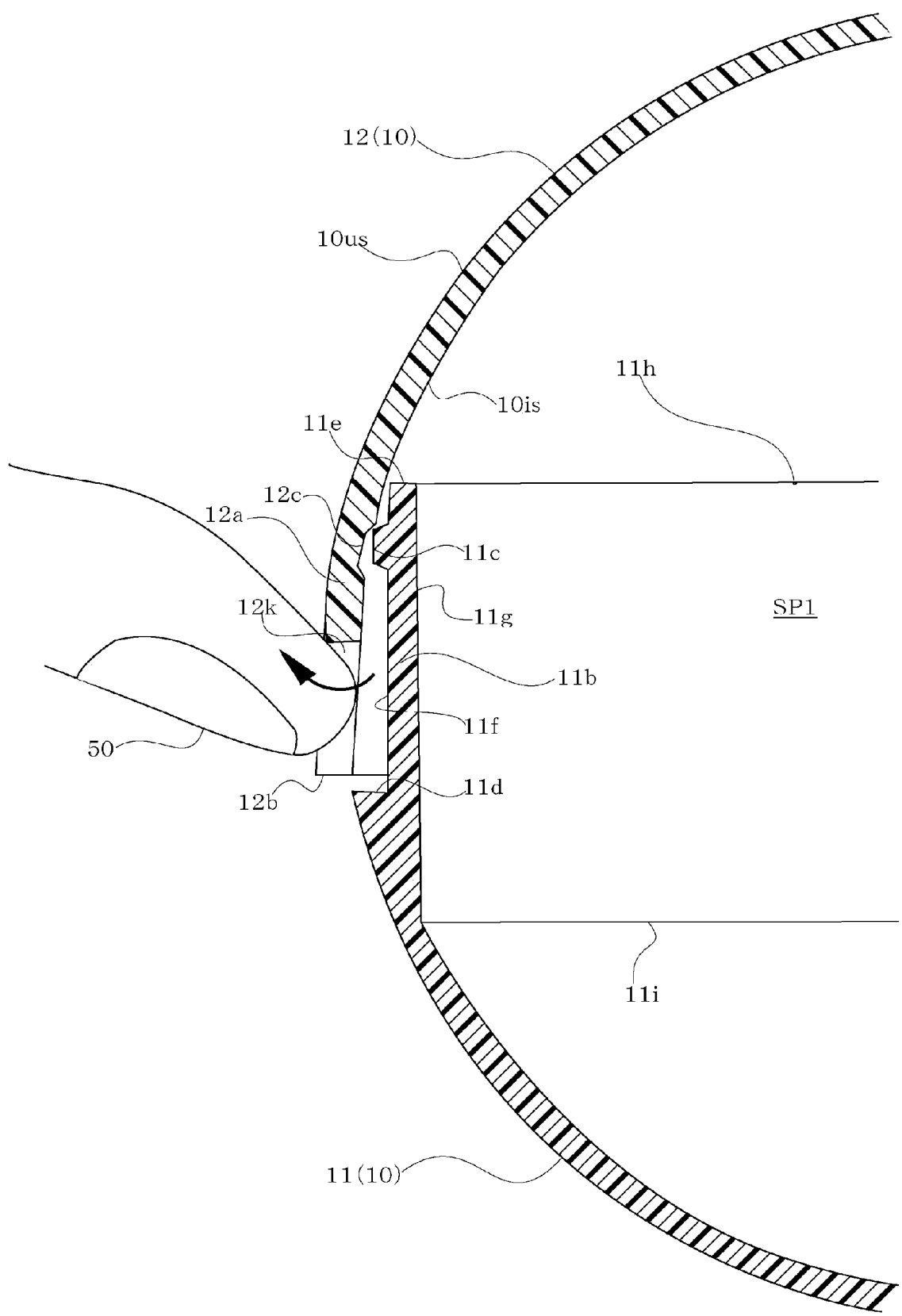
FIG. 4 is an enlarged cross-sectional view of the article accommodation container shown in FIG. 1 to show an example on how to open the article accommodation container.

FIG. 4 is an enlarged sectional view showing an example of how to open (how to release the connection) the article accommodation container 1. When the article accommodation container 1 is opened, as shown in FIG. 4, a fingertip 50 is hooked in the cutout portion 12k, and the overlapping portion 12a of the second main component 12 is separated from the projecting portion 11b of the first main component 11. As a result, the overlapping portion 12a elastically deforms outwardly from the body portion 10, so that the convex ridge portion 11c and the concave portion 12c are partially separated from each other, thereby making it easier to release the engagement of the convex ridge portion 11c and the concave portion 12c.

Figure 5:
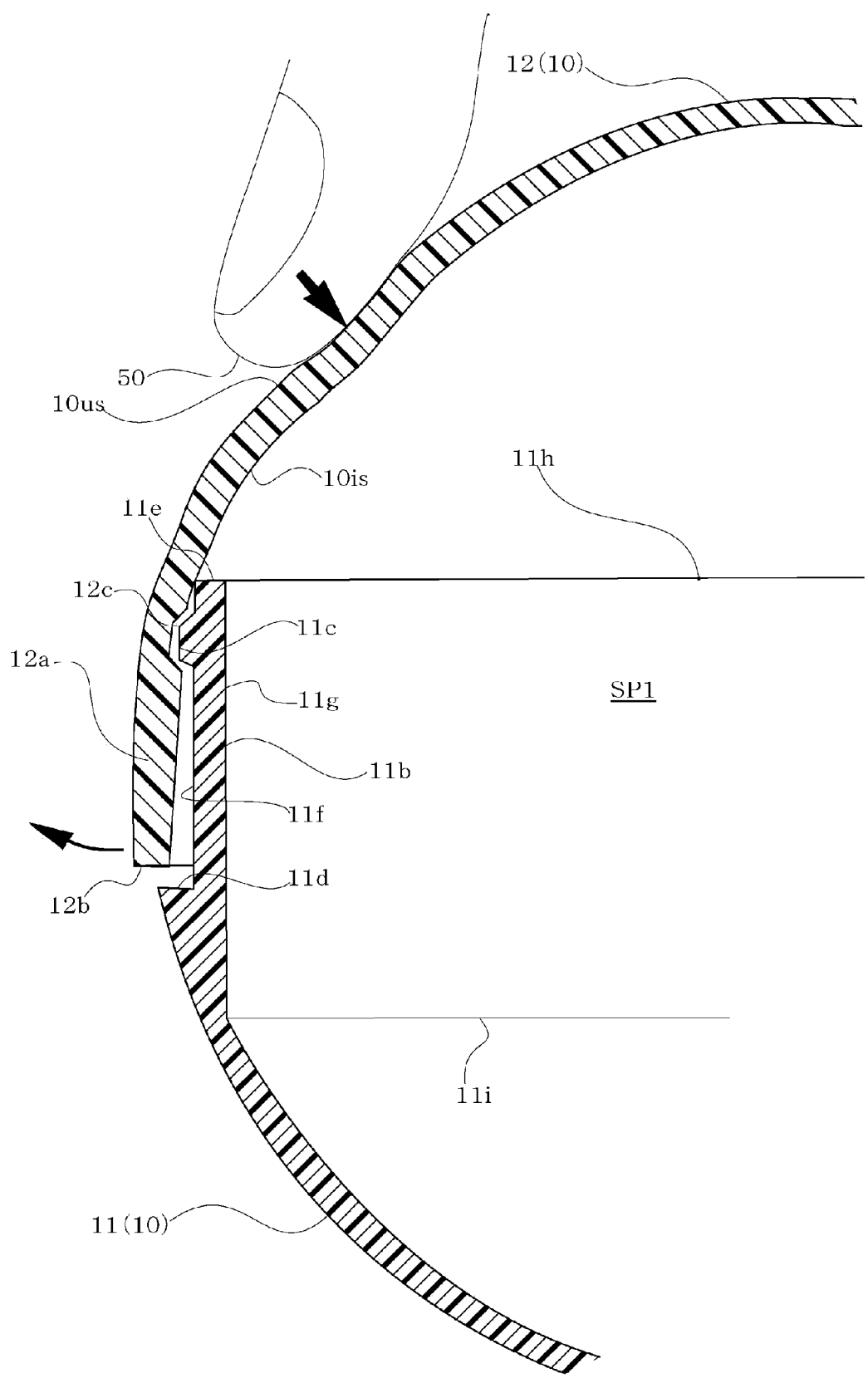
FIG. 5 is an enlarged cross-sectional view of the main part of the article accommodation container shown in FIG. 1 to show another example on how to open the article accommodation container.

FIG. 5 is another example of an enlarged sectional view showing how to open the article accommodation container 1. When the article accommodation container 1 is opened, in this example, the cutout portion 12k is not necessarily used. For example, the connection release operation can be performed by pressing the outer surface 10us of the body portion 10. In this case, as shown in FIG. 5, for example, on the side of the second main component 12, the outer surface 10us is pressed toward the inside of the container.

In this case, at the pressing position shown in FIG. 5, the side near the first end portion 11e, which is an opposite side to the third end portion 12b, is pressed, thereby causing the pressed portion (lower side of the fingertip 50) to be elastically deformed inward into the container. With this deformation, the inner surface of the upper end side of the overlapping portion 12a comes into contact with the first end portion 11e, and this contact portion acts as a fulcrum, causing the third end portion 12b to move away from the second end portion 11d. As a result, the convex ridge portion 11c and the concave portion 12c move in a direction in which they are tend to separate from each other, thereby making it easy to release the engagement.

The position to be pressed may not necessarily be the position shown in FIG. 5, and it may be possible to press a portion on a side of the first main component 11 instead of the portion of the side of the second main component 12. Furthermore, the pressing point may not necessarily be one point, and two or more points may be pressed by fingertips 50. In addition, a release method for using the pressing operation shown in FIG. 5 and the pulling operation of the cutout portion 12k shown in FIG. 4 simultaneously may be adopted.

Figure 6:
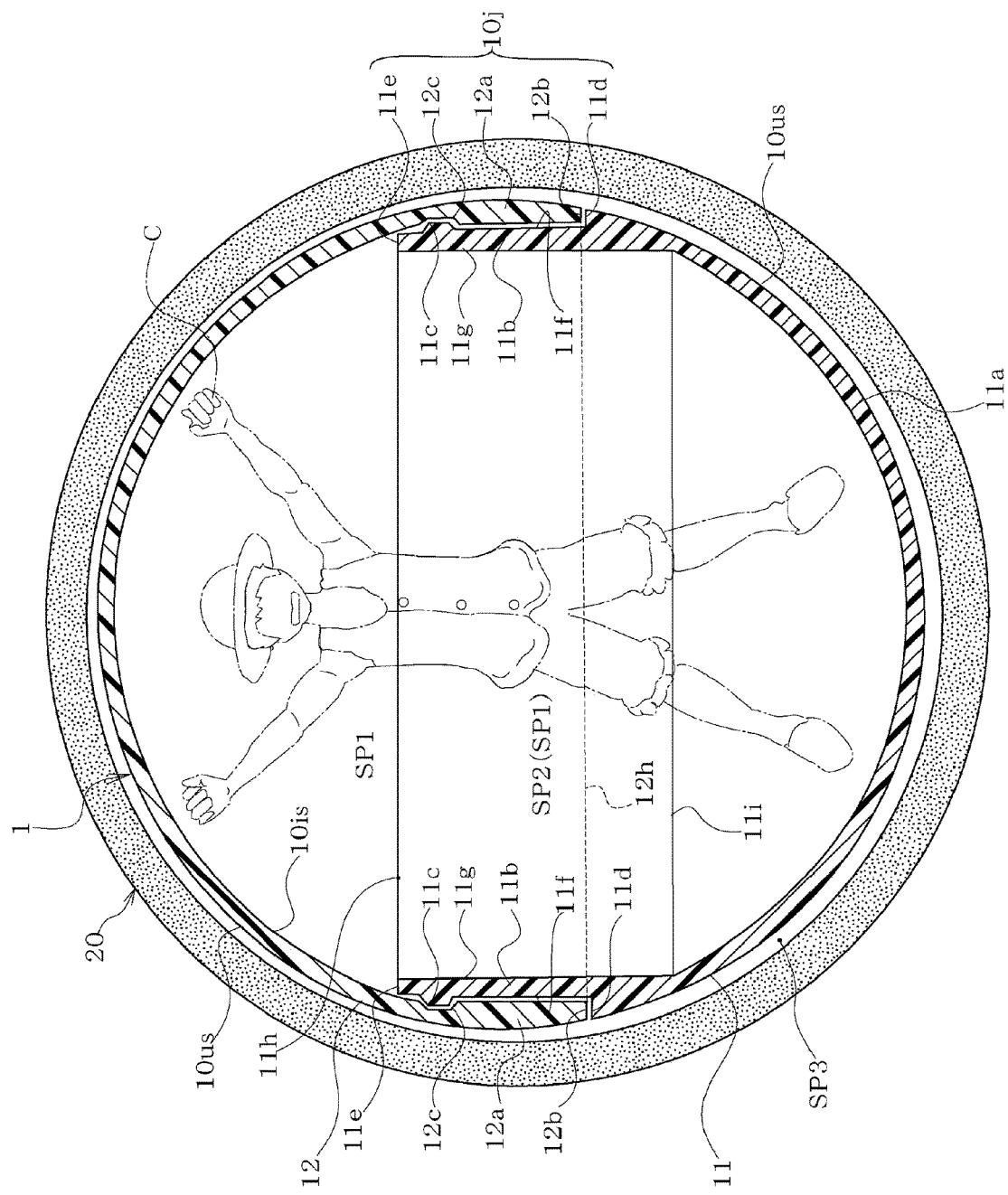
FIG. 6 is a cross-sectional view of the article accommodation container shown in FIG. 1 in a state where the article accommodation container is covered with a confection.

FIG. 6 is a sectional view illustrating an example where the article accommodation container 1 is covered with a confection 20. The article accommodation container 1 is covered with the confection 20 while containing an articles C in the internal space SP1. The entire body portion 10 is covered with the confection 20. Additionally, the article can be taken from the article accommodation container 1 by breaking and eating the confection 20. Furthermore, a gap SP3 is provided between the outer surface 10us of the body portion 10 and the confection 20, allowing the body portion 10 to oscillate within the confection 20. Since the body portion 10 is covered with confection 20, it is necessary to prevent the confection 20 from being damaged by accidentally breaking it into the two components, that is, the first main component 11 and the second main component 12, before the body portion 10 is picked up by the consumer. This problem can be avoided when the length L2 of the projecting portion 11b in the connection direction is or greater than ⅕ of the length D1 of the maximum diameter of the body portion 10. Additionally, this configuration facilitates the separation operation (opening operation) of the first main component 11 and the second main component if needed.

As described above, the body portion 10 of the article accommodating container 1 according to the present embodiment is formed by connecting the two components, that is, the first main component 11 and the second main component 12 of the article accommodating container 1, and the length L2 in the connection direction of the projecting portion 11b which forms the connecting portion 10j protruding in the connection direction of the connecting portion 10j is set to ⅕ or more of the maximum diameter length D1 of the body portion 10, so that the overlapping length between the first main component 11 and the second main component 12 can be increased. As a result, it is possible to provide such an article accommodating container 1 with good handling properties in which it is easy to maintain the connection state of the connecting portion 10j and it is easy to release the connection. Furthermore, by setting the length L2 of the projecting portion 11b to ⅓ or more of the maximum length L1 of the first main component 11, the connection strength can be increased.

In the present embodiment, the projecting portion 11b is provided only on the side of the first main component 11, and regarding the shape of the outside (outer surface 10us) of the connecting portion 10j, since the first main component 11 is covered by the second main component 12, the overlap portion 12a of the second main component 12 can form part of the spherical outer surface 10us.

In the present embodiment, the projecting portion 11b includes a second end portion 11d which forms a step protruding outward from the outer peripheral surface 11f of the projecting portion 11b at its protruding base end side, so that the third end portion 12b of the opening (second opening 12h) of the second main component 12 can be brought into contact with the second end portion 11d. As a result, the projecting portion 11b can be covered with the overlap portion 12a of the second main component 12 thereby creating a connection state where the projecting portion 11b is not visible from the outside.

In the present embodiment, since the cutout portions 12k are formed at the third end portion 12b, it is possible to hook a fingertip 50 when the connecting portion 10j is taken off. As a result, it is possible to easily open the body portion 10. Moreover, by providing the cutout portions 12k, it is possible to adjust the rigidity of the third end portion 12b and change the strength of the connection.

In the present embodiment, since the annular convex ridge portion 11c extending along the circumferential direction is formed on the outer peripheral surface 11f of the projecting portion 11b, the annular convex ridge portion 11c can be fit into the concave portion 12c of the second main component 12, and the connection state of the connecting portion 10j can be locked and maintained. Furthermore, since the position where and the convex ridge portion 11c is formed is on the tip side of the projecting portion 11b which is closer to the first end portion 11e, the displacement amount (displacement toward the inside of the container) due to elastic deformation of the projecting portion 11b can be increased. As a result, it is possible to easily change the position in the projecting direction of the convex ridge portion 11c at time when the convex ridge portion 11c and the concave portion 12c are engaged with each other and at time when the engagement thereof is released, thereby improving the operability of connection/release of the connection.

In the present embodiment, since the body portion 10 is configured to be deformable by pressing the outer surface 10us of the body portion 10, it is possible to easily release the engagement of the connecting portion 10j due to the positional deviation of the convex ridge portion 11c and the concave portions 12c caused by pressing the body portion 10.

In the present embodiment, since the body portion 10 is configured to have an internal space SP1 including a portion of the inner surface 10is which does not form a spherical surface, such as a cylindrical shape, it is possible to regulate the rotational movement of the article C accommodated in the internal space SP1.

Furthermore, in the present embodiment, since the body portion 10 is configured so that the article C accommodated therein cannot be viewed from the outside, it is possible to create an anticipation of what the article C contained is therein.

In the present embodiment, since the confection 20 is coated on the outer surface 10us of the body portion 10, it is possible to enjoy the article C accommodated inside the body portion 10 while it is possible to enjoy eating the confection 20.

Furthermore, in the present embodiment, since a gap SP3 is formed between the outer surface 10us of the body portion 10 and the confection 20, it is easy to separate the confection 20 from the body portion 10. Moreover, since the body portion 10 is configured to be swingable within the confection 20, for example, when shaking the confection 20, the inner surface of the confectionery 20 is hit by the body portion 10, so that a sound can be generated, and it can be enjoyed as a confection 20 which can generate such a sound.

Thus, the embodiments of the present invention are described above, but the present invention can be appropriately modified within the scope of its technical concept. For example, in the above embodiment, the projecting height of the projecting portion 11b is uniform over its entire circumference, but this configuration is not limited thereto, and the protrusion height may change so as to slope appropriately.

As described above, the following are described in the present specification:

(1) An article accommodating container comprises: a body portion made up of first and second main components, which can be connected to each other, wherein the first main component comprises a main body and a projecting portion, which projects from the main body and forms a connecting portion to be connected to the second main component, and the length of the projecting portion in a direction in which the connecting portion is connected to the first main component is ⅕ or more of the length of the maximum diameter of the body portion in a connected state.

(2) In the article accommodating container according to (1), a length of the projecting portion in the direction in which the projecting portion is connected to the first main component is ⅓ or more of the maximum length of the first main component in the connecting direction.

(3) In the article accommodating container according to (1) or (2), the projecting portion is provided on only the first main component within the first main component and the second main component.

(4) In the article accommodating container according to any one of (1)-(3), an outer surface of the body portion is in a spherical shape in a state where the first main component and the second main component are connected to each other.

(5) In the article accommodating container according to any one of (1)-(4), the first main component and the second main component are hollow and the inner shape of first main component and that of the second main component are different from each other.

(6) In the article accommodating container according to any one of (1)-(5), a first opening is formed in the first main component, and the projecting portion includes a first end portion, which forms a peripheral edge of the first opening on a tip side thereof, and the main body includes a second end portion configured to have a step in a direction intersecting the outer peripheral surface of the projecting portion at a base end side of the projecting portion.

(7) In the article accommodating container according to any one of (1)-(6), the second main component includes a second opening and a third end portion, which forms a peripheral edge of the second opening, and a connected state of the second main component and the first main component includes a state where the third end portion is in contact with the first end portion, and a state where the third end portion is in contact with the second end portion.

(8) In the article accommodating container according to any one of (1)-(7), the projecting portion is visible from the outside in a state where the third end portion of the second main component is in contact with the second end portion of the first main component.

(9) In the article accommodating container according to either (7)-(8), a cutout portion is formed in the third end portion of the second main component.

(10) In the article accommodating container according to any one of (6)-(9), a maximum length of an outer peripheral of the first end portion is shorter than a maximum length of an outer periphery of the second end portion.

(11) In the article accommodating container according to any one of (6)-(10), an annular convex ridge portion is formed on the outer periphery of the projecting portion along a circumferential direction of the outer periphery.

(12) In the article accommodating container according to (11), the convex ridge portion is formed at a position closer to the first end portion.

(13) In the article accommodating container according to either (11) or (12), a concave portion capable of receiving the convex ridge portion is formed in the second main component.

(14) In the article accommodating container according to any one of (1)-(13), the body portion is deformable by pressing an outer surface thereof.

(15) In the article accommodating container according to any one of (1)-(14), the outer periphery of the projecting portion is in contact with the an inner surface of the second main component in a state where the first main component and the second main component are connected to each other.

(16) In the article accommodating container according to any one of (1)-(15), the outer surface of the main body forms a spherical surface as a whole, and an inner space, which does not form a spherical surface, is configured by an inner surface thereof, in a state where the first main component and the second main component are connected to each other.

(17) In the article accommodating container according to (16), the inner space includes a cylindrically shaped space.

(18) In the article accommodating container according to any one of (1)-(17), the main body is configured so that an article accommodated inside the body portion is invisible from an outside, in a state where the first main component and the second main component are connected to each other.

(18) In the article accommodating container according to any one of (1)-(18), an outer surface of the body portion is entirely covered with a confection.

(19) In the article accommodating container according to (19), a gap is formed between the outer surface of the body portion and the confection, and the body portion is swingable inside the confection.

The invention claimed is:

1. An article accommodating container comprising:
a body portion which includes a first main component and a second main component, which can be connected to each other,
wherein the first main component comprises a main body and a projecting portion, which projects from the main body and forms a connecting portion to be connected to the second main component,
a length of the projecting portion in a connecting direction of the first main component and the second main component is $\frac{1}{5}$ or more of a length of a maximum diameter of the body portion in a connected state,
the first main component has a first opening,
the projecting portion of the first main component includes a first end portion, which forms a peripheral edge portion of the first opening on a tip side thereof,
the main body of the first main component includes a second end portion, which is configured to have a step on a base end side of the projecting portion in a direction intersecting the outer peripheral surface of the projecting portion,
a convex ridge portion is formed on an outer peripheral surface of the projecting portion,
a concave portion is formed in the second main component, and configured to receive the convex ridge portion when the first main component and the second main component are connected to each other,
the body portion is configured to be deformed by pressing an outer surface of the body portion,
the second main component has a second opening, and an overlapping portion where the first main component is overlapped with the second component when the first main component and the second main component are connected to each other, and
the first main component and the second main component are configured so that when the body portion is pressed, an inner surface of the overlapping portion comes into contact with the first end portion, so that the first end portion acts as a fulcrum, causing a third end portion, which forms a peripheral edge portion of the second opening of the second main component, to move away from the first main component, thereby releasing an engagement of the convex portion and the concave portion.

2. The article accommodating container according to claim 1, wherein the length of the projecting portion in the connecting direction is ⅓ or more of a maximum length of the first main component in the connecting direction.

3. The article accommodating container according to claim 2, wherein the projecting portion is provided on only the first main component.

4. The article accommodating container according to claim 3, wherein an outer surface of the body portion is in a spherical shape in state where the first main component and the second main component are connected to each other.

5. The article accommodating container according to claim 4, wherein the first main component and the second main component are hollow, and an inner shape of the first main component and that of the second main component different are different from each other.

6. The article accommodating container according to claim 1, wherein the connected state of the second main component and the first main component includes a state where the third end portion is in contact with the first end portion, and a state where the third end portion is in contact with the second end portion.

7. The article accommodating container according to claim 6, wherein the projecting portion is invisible from an outside in a state where the third end portion of the second main component is in contact with the second end portion of the first main component.

8. The article accommodating container according to claim 6, wherein a cutout portion is formed in the third end portion of the second main component.

9. The article accommodating container according to claim 1, wherein a maximum length of an outer peripheral of the first end portion is shorter than that of an outer periphery of the second end portion.

10. The article accommodating container according to claim 1, wherein the convex ridge portion is formed at a position closer to the first end portion.

11. The article accommodating container according to claim 1, wherein the outer peripheral surface of the projecting portion is brought in contact with an inner surface of the second main component in a state where the first main component and the second main component are connected to each other.

12. The article accommodating container according to claim 1, wherein the outer surface of the body portion forms a spherical surface as a whole, and an inner space thereof, which does not form a spherical surface, is formed by part of an inner surface thereof, in a state where the first main component and the second main component are connected to each other.

13. The article accommodating container according to claim 12, wherein the inner space includes a cylindrically shaped space.

14. The article accommodating container according to claim 1, wherein the body portion is configured so that an article accommodated inside the body portion is invisible from an outside, in a state where the first main component and the second main component are connected to each other.

15. The article accommodating container according to claim 1, wherein an outer surface of the body portion is entirely covered with a confection.

16. The article accommodating container according to claim 15, wherein a gap is formed between the outer surface of the body portion and the confection, and the body portion is swingable inside the confection.

* * * * *